E. S. Pierce.
Wood Screw.
No. 3,941. Reissued Apr. 26, 1870.
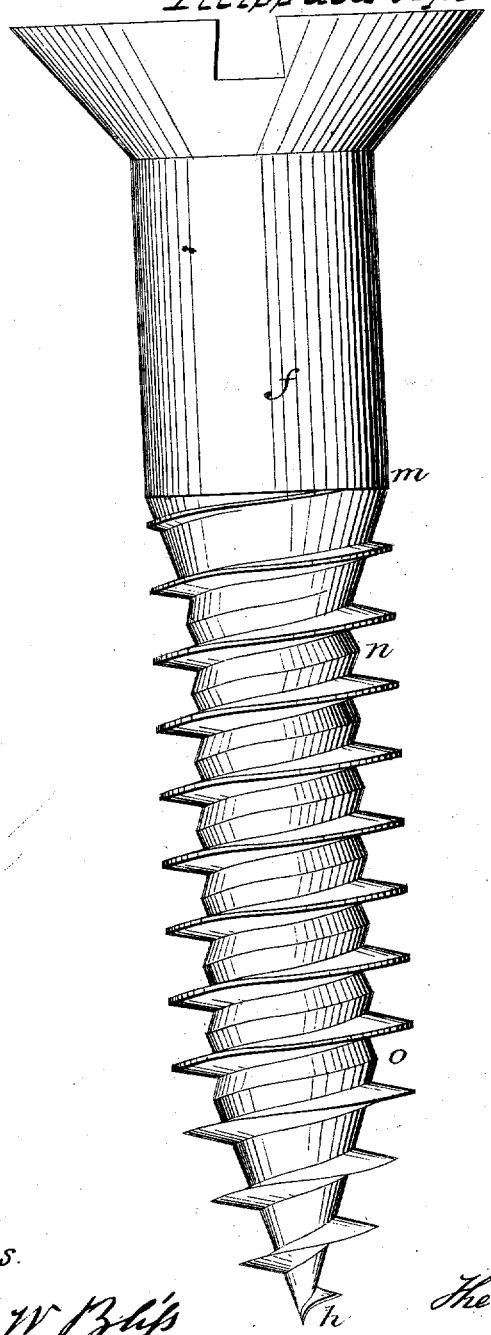
Witnesses.
Jeremy W. Bliss
Alfred Watkinson
Inventor.
The National Screw Co.
by Geo. Clark
President.
N. PETERS, PHOTO-LITHOGRAPHER, WASHINGTON, D. C.

United States Patent Office.

THE NATIONAL SCREW COMPANY, OF HARTFORD, CONNECTICUT, ASSIGNEES OF ELIJAH S. PIERCE.

*Letters Patent No.* 87,198, *dated February* 23, 1869; *reissue No.* 3,941, *dated April* 26, 1870.

DIVISION B.

IMPROVEMENT IN SCREWS.

The Schedule referred to in these Letters Patent and making part of the same.

*To all whom it may concern:*

Be it known that ELIJAH S. PIERCE did invent a certain new and useful Improvements in Tool for Cutting Screws, and a new Improved Screw, as the product therefrom; and to enable others skilled in the art to make and use the same, we, THE NATIONAL SCREW COMPANY, of the city and county of Hartford and State of Connecticut, assignees of the said ELIJAH S. PIERCE, will proceed to described its construction and advantage, referring to the drawings, in which the same letters indicate like parts in the figure.

The nature of this invention consists of a screw, having at the end of the core at the commencement of the thread, and at the point of the screw, a conical form, and the intermediate part the form of a low supplemental thread or elevation between the convolutions of the principal threads.

In the accompanying drawings—

Figure 1 shows a horizontal view of the screw, being merely an enlarged view of Figure 5 of the original drawing,

*h*, being the conical point, and

*o*, the supplemental thread.

The tool is a straight steel bar, of the cross-section, having its extremity ground off to a proper angle, back from the edges, to form a cutting-tool, and to such lateral angle that when the tool is in use, and held to the blank in the direction corresponding to the pitch of the thread, the plane of the said extremity shall lie parallel to the longitudinal axis of the blank.

The sides of the groove and the outside edges form the thread, and the edges the bottom of the groove.

The tool is held to the blank in such position that the direction of the groove shall correspond to the direction or pitch of the thread, and is moved forward against and laterally along the screw-blank in the manner usual in screw-cutting and threading-machines.

The advantages of this invention are, the screw is made to enter more easily and hold more firmly than when the bottom of the groove is of a volute form at the ends of the thread, and cylindrical in the middle.

We believe we has thus shown the nature, construction, and advantage of this invention, so as to enable others skilled in the art to make and use the same therefrom.

What we claim, and desire to secure by Letters Patent, is—

The screw, as shown, combining a conical point to the core and a supplemental thread or elevation between the convolutions of the thread proper, all substantially as and for the purpose set forth.

THE NATIONAL SCREW CO., [L. S.]
By EZRA CLARK, *President.*

Witnesses:
JEREMY W. BLISS,
ALFRED WATKINSON.